United States Patent [19]

Bivens

[11] Patent Number: 5,220,706
[45] Date of Patent: Jun. 22, 1993

[54] AIR DAMPER

[75] Inventor: Steven L. Bivens, Kankakee, Ill.

[73] Assignee: Illinois Tool Works Inc., Glenview, Ill.

[21] Appl. No.: 899,706

[22] Filed: Jun. 17, 1992

[51] Int. Cl.[5] .......................... E05F 16/00; F16F 9/50
[52] U.S. Cl. ............................................. 16/66; 16/84;
92/26; 188/282; 188/311; 188/322.17; 267/225
[58] Field of Search ............... 16/66, 84; 92/26, 170.1,
92/248; 188/282, 311, 322.17; 267/225, 226

[56] References Cited

U.S. PATENT DOCUMENTS 2,881,467  4/1951  Struhar .................................. 16/66
4,924,285  12/1990  Enrietti .................................. 16/66

Primary Examiner—W. Donald Bray
Attorney, Agent, or Firm—Thomas W. Buckman; John P. O'Brien

[57] ABSTRACT

An air damper utilizing only recirculating internal air for dampening in one direction of movement an openable object includes inner and outer cylinder members, primary and secondary shafts, first and second controllable orifice structures, primary and secondary end caps, and primary and secondary compression springs. The first controllable orifice structure restrains the flow of air from a first shaft chamber to the first head chamber to pass only through a first orifice in accordance with the movement of the primary shaft in a first axial direction. The second controllable orifice structure restrains the flow of air from a second shaft chamber to a second head chamber to pass only through a second orifice in accordance with the movement of the secondary shaft in the first axial direction.

20 Claims, 2 Drawing Sheets

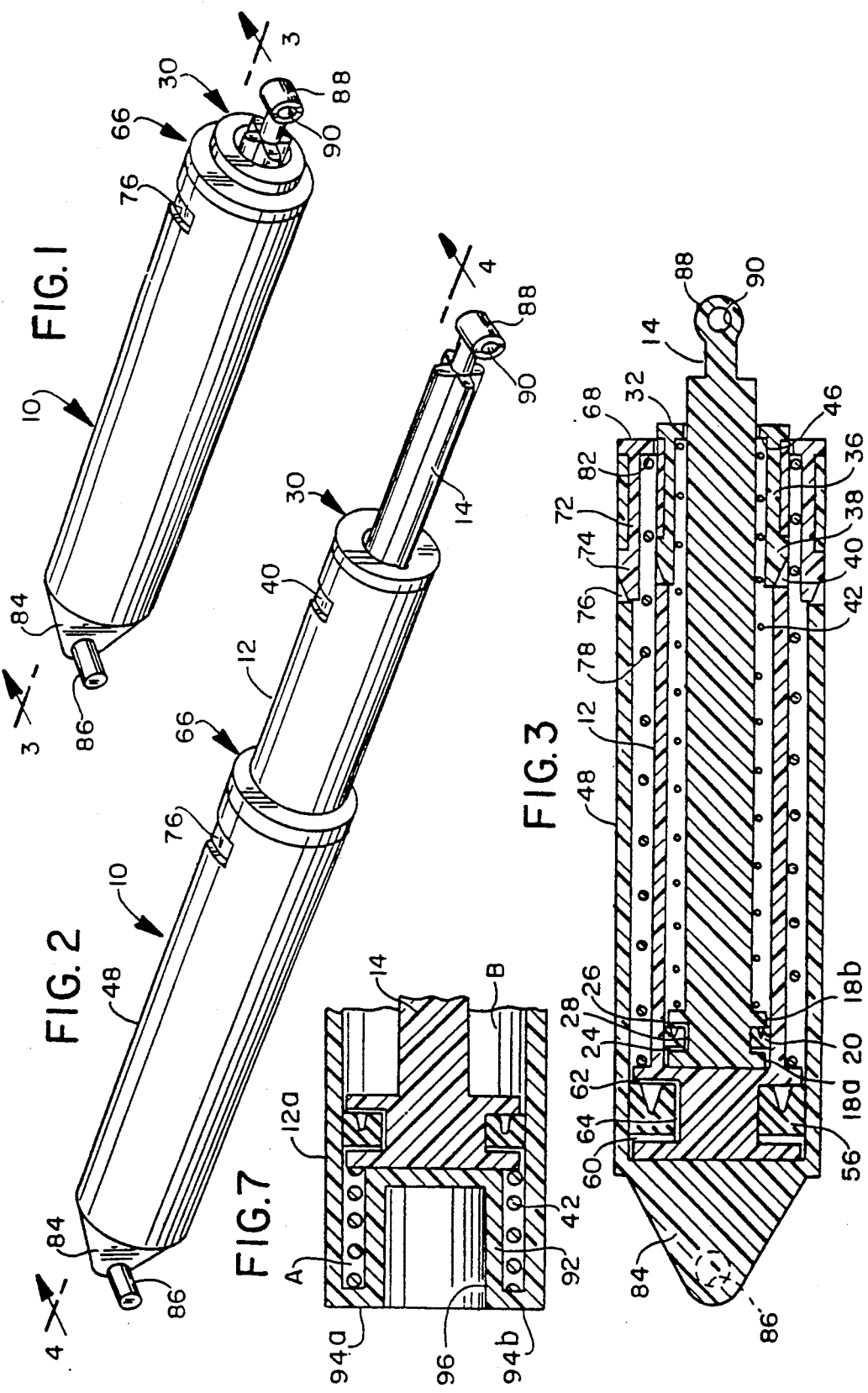

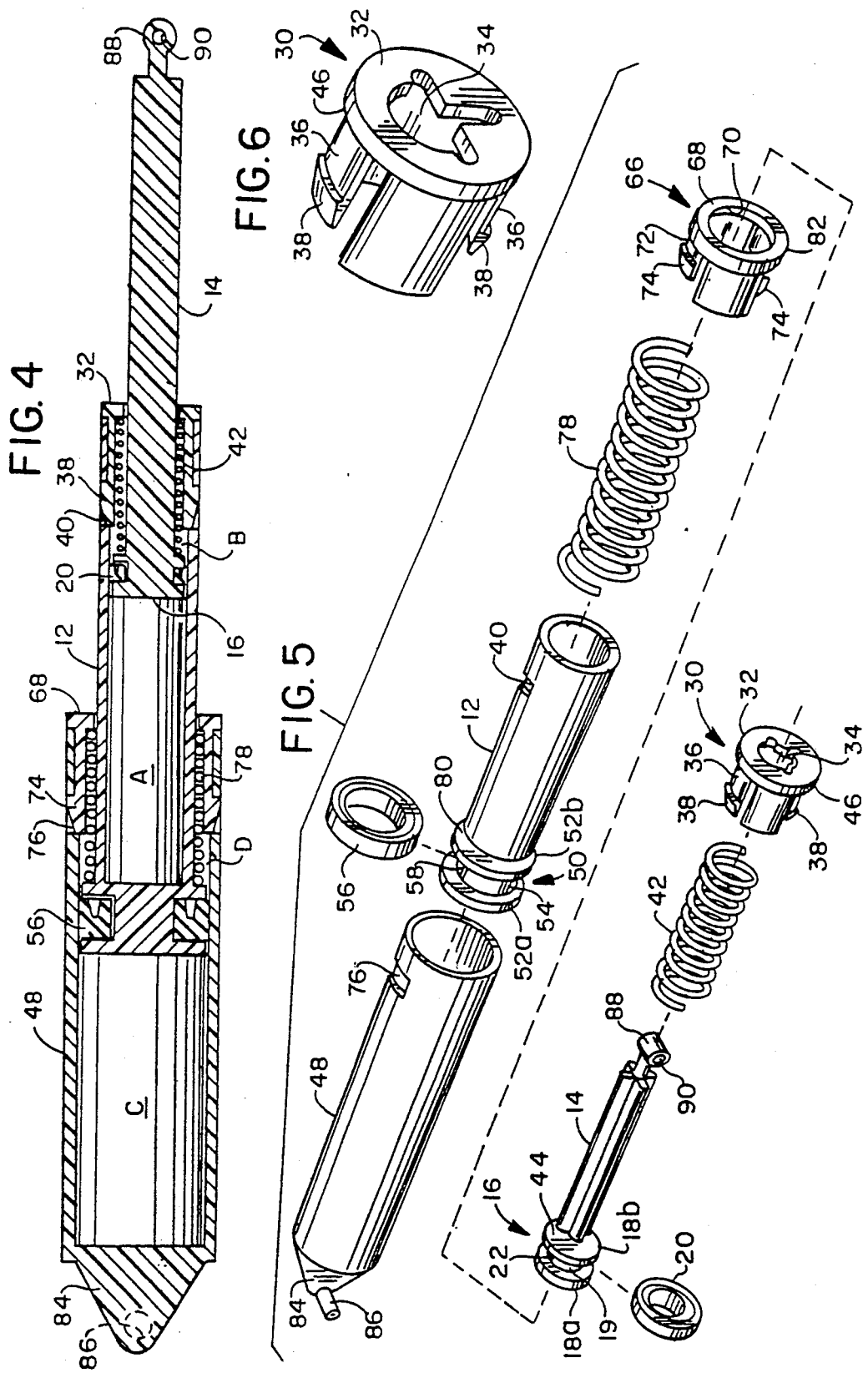

AIR DAMPER

BACKGROUND OF THE INVENTION

1. Field of the Invention

This invention relates generally to damper devices for dampening the opening and closing of an openable object such as a door, ashtray, chest or the like relative to a main body. More particularly, the present invention relates to an improved air damper of a unique construction which includes dual controllable orifice means for enabling the openable object of a varying load, such as a glove compartment door, to be opened gently from a closed state.

2. Description of the Prior Art

As is generally known in the art, if an openable object is allowed to abruptly open relative to its main body the impact between them may not only cause damage to occur possibly destroying both of them, but can also produce vibration and noise to render the contents stored within the openable object to fall out and become scattered. For example, when the openable object is a glove compartment door installed in the interior of an automotive vehicle the sudden impact opening Will cause the items therein to be tossed or thrown all over the passenger, seat and floor of the car. In order to avoid this type of problem, there has been provided in the prior art damper devices for absorbing the impact created between the main body and the openable object.

A state-of-the-art search directed to the subject matter of this application in the U.S. Patent and Trademark Office uncovered the following U.S. Letters Patent:

| | |
|---|---|
| 2,063,526 | 4,629,167 |
| 2,881,467 | 4,856,625 |
| 3,593,367 | 4,974,285 |

There is disclosed in U.S. Pat. No. 2,063,526 to W. F. Snowdon issued on Dec. 8, 1936, a door check formed of a tubular casing 1 with springs 15 and 16, friction retarding elements 21 and 22, and a wedge 20. One end of the casing is typically held to the door frame 9 and a rod 18 extending from the other end is typically attached to the door 23. The interior is arranged so that as the door opens the springs are readily compressed for easy opening. As the door is released the springs automatically close the door and at the same time force the wedge 20 into the friction elements 21 and 22 which bear against the inner surface of the casing retarding the closing of the door until the friction elements reach an enlarged part of the casing. At that time, the friction elements are released so as to permit a gradual and final closing movement of the door.

There is disclosed in U.S. Pat. No. 2,881,467 to J. Struhar issued on Apr. 14, 1959, a door check and closer which is comprised of essentially two pistons 31, 45 and two cylinders 20, 30 telescopically arranged with two compressed springs 28, 40 resisting their telescopic extension. When the pistons 31, 45 are moved to the left relative to FIG. 3 of the '467 patent, during initial door opening, air will be forced through the vents 29 and 50 to make for easy initial door opening until these pistons pass over the vents and begin compressing air in chamber B of the cylinder 20 and chamber C of the cylinder 30. Conversely, when the pistons 31, 45 are rapidly moved to the right relative to FIG. 4 of the '467 patent by recoil of both springs 28 and 40 past the vents 29 and 50, air is trapped and compressed in the air chamber A of the cylinder 20 and in the air chamber D of the cylinder 30 to cushion door closing.

In U.S. Pat. No. 3,593,367 to R. W. Waldo issued on Jul. 20, 1971, there is taught a pneumatic door closer which includes an elongated casing 8 and piston means. The piston means includes a body structure defining a radially outwardly opening annular channel 28 having axially spaced side walls. The piston means further includes a sealing ring 38 movable axially toward and away from one of the side walls and a porous lubricating ring 39 disposed between the other one of the side walls and the sealing ring. Both rings frictionally engage the cylindrical surface of the casing 8 in which the piston means is axially movable. The piston means includes a pair of cooperating elements welded together and to the inner end of the plunger rod 12 which extends axially outward of one end of the casing.

In U.S. Pat. No. 4,629,167 to S. Kimura et al. issued on Dec. 16, 1986, there is taught a piston-cylinder type damper which includes a cylinder 11 connected to either member of the pair of a main body and an openable object, and a piston 12 connected to the other member of the pair and adapted to fit into the cylinder 11. The piston 12 incorporates therein a check valve 16 adapted to allow the air in the cylinder to escape from the cylinder interior while the piston is driven into the cylinder by the movement of the openable object. On the other hand, when the piston is being withdrawn from the cylinder the check valve is kept closed thereby creating the dampening action.

In U.S. Pat. No. 4,856,625 to T. Oshida issued on Aug. 15, 1989, there is described a cylinder type damper device for dampening the opening and closing movement of a storage box. The damper device includes a cylinder member 4 enclosing air therein, an end cap 10 with a filter 18 therein, and a rod 6 reciprocally movably inserted into the cylinder member. The front end of the rod is provided with a piston 5 for dividing the interior of the cylinder member 4 into a head chamber 4a and a rod chamber 4b. The piston 5 has an orifice 7 formed throughout its entire length in the axial direction thereof and being for interchanging air in the head and rod chambers by the axial movement thereof. The piston 5 also has air holes 9 which are likewise formed throughout its entire length in the axial direction thereof. A check valve 8 is provided for blocking the interchanging of air between the head and rod chambers in accordance with the one directional movement in the axial direction of the piston.

Finally, there is disclosed in U.S. Pat. No. 4,974,285 to L. Enrietti issued on Dec. 4, 1990, a device for assisting in the opening and closing of a pivotally mounted member. The device includes an elongated housing a cylindrical slide 2 mounted slidably in the housing, a helical spring 3 mounted between the housing and the slide for retaining the slide in the housing in a retracted position, and braking devices for retarding movement of the slide in either direction. The braking devices comprise two small nozzle-shaped orifices 5 formed in the end wall 4 of the housing 1 through which air has to flow into and out of as the slide moves relative to the housing.

However, none of the prior art uncovered in the search disclosed an air damper of a unique construction like that of the present invention which includes dual controllable orifice means for enabling the openable object of a varying load, such as a glove compartment door, to be opened gently from a closed state.

SUMMARY OF THE INVENTION

Accordingly, it is a general object of the present invention to provide an improved air damper utilizing only recirculating internal air for dampening an openable object which is relatively simple and economical to manufacture and use.

It is an object of the present invention to provide an improved air damper which is adapted to accommodate heavier varying loads within a relatively smaller area than that is traditionally available.

It is another object of the present invention to provide an improved air damper which has an overall length in its retracted position which is shorter than those traditionally available, but yet still provides a longer stroke length in its extended position.

It is still another object of the present invention to provide an improved air damper which includes dual controllable orifice means for enabling the openable object of a varying load to be opened gently from a closed state.

In accordance with these aims and objectives, the present invention is concerned with the provision of an improved air damper utilizing only recirculating internal air for dampening in one direction of movement of an openable object of a varying load which is openable and closable with respect to a main object. The air damper includes inner and outer cylinder members, primary and secondary shafts, primary and secondary end caps, and primary and secondary compression springs. The inner cylinder has a closed end and an open end. The primary shaft is reciprocally movably inserted into the inner cylinder member and includes at its front end a first piston head telescopically slidable in the interior wall of the inner cylinder member for dividing the same into a first head chamber and a first shaft chamber. The first piston head is formed of a pair of axially spaced-apart first and second disc-like members connected by a first rod, and a primarily lip seal mounted slidably in an annular groove formed in the outer peripheral surface of the first rod.

A first controllable orifice structure includes a first orifice formed in a portion of the first disc-like member, a second orifice formed in a portion of the second disc-like member, and a slot formed in the circumference of the first rod and extending throughout the entire length in the axial direction. The primary lip seal restrains the flow of air from the first shaft chamber to the first head chamber to pass only through the first orifice in accordance with the movement of the primary shaft in a first axial direction. The primary end cap is fixedly secured in the opened end of the inner cylinder member and has an annular flange with an opening for receiving the primary shaft therethrough. The first compression spring is disposed around the primary shaft and is held between the second disc-like member and the annular flange of the primary end cap to resist projection of the primary shaft.

The outer cylinder member has a closed end and an open end. The inner cylinder member functioning as the secondary shaft is reciprocally movably inserted into the outer cylinder member and includes at its front end the second piston head telescopically slidable in the interior wall of the outer cylinder member for dividing the same into a second head chamber and a second shaft chamber. The second piston head is formed of a pair of axially spaced-apart third and fourth disc-like members connected by a second rod, and a secondary lip seal mounted slidably in an annular groove formed in the outer peripheral surface of the second rod.

A second controllable orifice structure includes a third orifice formed in a portion of the third disc-like member, a fourth orifice formed in a portion of the fourth disc-like member, and a slot formed in the circumference of the second rod and extending throughout the entire length in the axial direction. The secondary lip seal restrains the flow of air from the second shaft chamber to the second head chamber to pass only through the third orifice in accordance with the movement of the secondary shaft in the first axial direction. The secondary end cap is fixedly secured in the opened end of the outer cylinder member and has an annular flange with an opening for receiving the secondary shaft therethrough. The second compression spring is disposed around the secondary shaft and is held between the fourth disc-like member and the annular flange of the secondary end cap to resist projection of the secondary shaft.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a top view of an air damper constructed in accordance with the principles of the present invention, illustrating the components in their fully retracted position;

FIG. 2 is a top view similar to FIG. 1, but illustrating the components in their fully extended position;

FIG. 3 is a longitudinal section, taken along the lines 3—3 of FIG. 1;

FIG. 4 is a longitudinal section, taken along the lines 4—4 of FIG. 2;

FIG. 5 is an exploded, perspective view of the present air damper;

FIG. 6 is a perspective view of the primary end cap of FIG. 5; and

FIG. 7 is a fragmentary, longitudinal section view of a second embodiment of the inner cylinder having a reduced air volume to permit a quicker dampening effect.

DESCRIPTION OF THE PREFERRED EMBODIMENTS

Referring now in detail to the drawings, there is shown an air damper 10 utilizing only recirculating internal air for absorbing or braking the opening movement of an openable object, such as a glove compartment door (not shown) installed in the interior of an automotive vehicle, relative to a main body such as a glove compartment housing (also not shown) mounted in a dashboard. The present air damper 10 is adapted to accommodate heavier varying loads within a relatively smaller area. This is due to the fact that the overall length of the air damper in its fully retracted position is shorter than those traditionally available, but yet still provides a longer stroke length in its fully extended position.

As shown in FIGS. 1-5, the air damper comprised of an inner cylinder member 12 and a primary shaft 14 reciprocally movably inserted into the cylinder member 12. At the front end of the primary shaft 14, there is provided a piston head 16 which is slidable in the interior wall of the cylinder member 12 for dividing the same into a head chamber A and a shaft chamber B. The piston head 16 consists of a pair of axially spaced-apart disc-like members 18a and 18b which are connected by a rod 19 of a reduced diameter. The disc-like members receive therebetween a primary lip seal 20 mounted slidably in an annular groove 22 formed in the outer peripheral surface of the rod 19.

A first orifice 24 is formed in a portion of the disc-like member 18a, and a second orifice 26 is formed in a portion of the disc-like member 18b. The second orifice 18b is made to be relatively larger than the first orifice 18a. A slot 28 is provided on the circumference of the rod 19 and extends throughout its entire length in the axial direction so as to provide an air passageway connecting the first and second orifices defining first controllable orifice means. The primary lip seal 20 serves to restrict the flow of air to pass only through the first orifice 18a in accordance with the movement of the primary shaft 14 in a first axial direction.

The inner cylinder member 12 is formed of a substantially cylindrical-shaped body extending between a closed end and an open end. The opened end of the cylinder member 12 receives an anti-twist primary end closure or retainer cap 30. As can best be seen from FIGS. 5 and 6, the end cap 30 is formed of a cylindrical shape with its one end thereof closed by an annular flange 32. The annular flange 32 is provided in its central portion with a cut-out 34 of a unique contour for receiving the primary shaft 14 therethrough to form an anti-twist means so as to prevent the primary shaft 14 from being rotated or twisted relative to the inner cylinder member 12. It will be noted that the primary shaft 14 is of a cruciform cross-section whose contour conforms to the cut-out 34 of the end cap 30.

Further, the end cap 30 is formed with annular marginal sections 36 each having a prong or projection 38. The prongs 38 are adapted to snappingly engage into rectangularly-shaped opposed openings 40 formed on the marginal portion adjacent the opened end of the inner cylinder member 14 so as to fixedly secure the end cap 30 to the cylinder member 12. A weaker primary compression spring 42 is disposed around the primary shaft 14 and is held within the interior of the inner cylinder member 12 between the rear surface 44 of the disc-like member 18b and the inner surface 46 of the annular flange 32 of the primary end cap 30.

The air damper 10 is further comprised of an outer housing or cylinder member 48 and a secondary shaft 12 reciprocally movably inserted into the outer cylinder member 48. It will be noted that the inner cylinder member 12 functions as the secondary shaft when it is moved in association with the outer cylinder member 48. Therefore, the front end of the secondary shaft 12 is similarly provided with a second piston head 50 which is slidable within the interior wall of the outer cylinder member 48 for dividing the same into a head chamber C and a shaft chamber D. The second piston head 50 consists of a pair of axially spaced-apart disc-like members 52a and 52b which are connected by a second rod 54 of a reduced diameter. The disc-like member receives therebetween a secondary lip seal 56 mounted slidably in an annular groove 58 formed in the outer peripheral surface of the rod 54.

A third orifice 60 is formed in a portion in the disc-like member 52a, and a fourth orifice 62 is formed in a portion of the disc-like member 52b. The fourth orifice 62 is made to be relatively larger than the third orifice 60. A slot 64 is provided on the circumference of the second rod 54 and extends throughout its entire length in the axial direction so as to provide an air passage connecting the third and fourth orifices defining second controllable orifice means. The secondary lip seal 56 serves to restrict the flow of air to pass only through the third orifice in accordance with the movement of the secondary shaft 12 in the first axial direction.

The housing 48 is formed of a substantially cylindrical-shaped body extending between a closed end and an open end. The opened end of the housing 48 receives a secondary end closure or retainer cap 66. As can be seen from FIG. 5, the secondary retainer cap 66 is formed of a cylindrical shape with its one end thereof closed by an annular flange 68. The annular flange 68 is provided in its central portion with an aperture 70 for receiving the secondary shaft 12 therethrough.

Further, the secondary retainer cap 66 is formed with annular marginal portions 72 each having a prong or projection 74. The prongs 74 are adapted to snappingly engage into rectangularly-shaped opposed openings 76 formed in the marginal portion adjacent the open end of the outer cylinder member 48 so as to fixedly secure the secondary retainer cap 66 to the cylinder member 48. A stronger secondary compression spring 78 is disposed around the secondary shaft 12 and is held within the interior of the housing 48 between the rear surface 80 of the disc-like member 52b and the inner surfaces 82 of the annular flange 68 of the secondary retainer cap 66.

The closed end of the outer cylinder member 48 is formed integrally with a flattened mounting end portion 84 having an opening 86 which may be attached to the side wall of the glove compartment housing in the dashboard of the automotive vehicle. The outer end of the primary shaft 14 is provided with an end portion 88 having an opening 90 which may be attached to the glove compartment door. In the alternative, the outer cylinder member 48 may be attached to the glove compartment door and the primary shaft may be attached to the glove compartment housing. In this manner, the door can be freely opened and closed relative to the glove compartment housing mounted in the dashboard.

The operation of the present air damper 10 will now be described with reference to FIGS. 3 and 4 of the drawings. As illustrated in FIG. 3, the primary spring 42 engages the first piston head 16 to normally retract the primary shaft 14 within the inner cylinder member 12, and the secondary spring 78 engages the second piston head 50 to normally retract the secondary shaft 12 (inner cylinder member) within the outer housing 48. Thus, both piston heads 16 and 50 are normally retracted within the outer housing or cylinder member 48.

During the initial glove compartment door opening movement after a door latch is released, the extending stroke of the primary shaft 14 (toward the right relative to FIG. 3) created by the weight of the door and the contents stored in the glove compartment housing will be opposed only by the weaker primary spring 42. Thus, the primary shaft will be extended or projected before any movement or extension of the secondary shaft 12 occurs. It will be noted that the internal pressure of the head chamber A located at the left side of the piston head 16 is reduced and the internal pressure of the shaft chamber B is increased. As the primary shaft 14 moves towards the right, the primary lip seal 20 will be forced against the disc-like member 18a so as to eliminate all air flow from the shaft chamber B to the rod chamber A, except through the first orifice 24 via the second orifice 26 and the slot 28 thus causing a vacuum.

As the door continues to open farther, the secondary shaft 1 (inner cylinder member) begins to compress the stronger spring 78, adding more resistance to the door opening. It will be noted that the internal pressure of the head chamber C located at the left side of the piston head 50 is reduced and the internal pressure of the shaft chamber D is increased. Similarly, as the secondary shaft moves towards the right, the secondary lip seal 56 will be forced against the disc-like member 52a so as to eliminate all air flow from the shaft chamber D to the head chamber C, except through the third orifice 60 via the fourth orifice 62 and the slot 64 thus causing a vacuum. The primary shaft 14 and the secondary shaft 12 are illustrated in their fully extended positions in FIG. 4.

Therefore, it can be seen that the present air damper applies an increased force as the door is opened farther, i.e., the secondary dampening effect is greater than the primary dampening so as to create a smooth consistent dampening effect as the door force changes. It should be clearly understood that the tension of the compression springs 42, 78 and the size of the air flow orifices 24, 26, 60 and 62 can be changed to compensate for different varying loads.

On the other hand, in the door closing from the fully extended position of FIG. 4, the aforementioned operations described above will be merely reversed. During such door closing, the stronger spring 78 being compressed will operate initially to exert its stored force to retract the secondary shaft 12 to start the door closing movement. This causes the secondary lip seal 56 to move against the disc-like member 52b permitting communication between the chambers C and D through the orifices 60 and 62, slot 64 and adjacent areas all at one time. Therefore, no braking force acts on the movement of the piston head 50 towards the left and the secondary shaft moves smoothly.

Thereafter, the weaker spring 42 will begin to exert its stored force to retract the primary shaft 14 to complete the door opening. This causes the primary lip seal 20 to move against the disc-like member 18b permitting communication between the chambers A and B through the orifices 24 and 26, slot 28, and adjacent areas all at one time. Therefore, no braking force acts on the movement of the piston head 16 towards the left and the primary shaft 14 moves smoothly.

Referring now to FIG. 7, there is shown a second embodiment of the inner cylinder 12a which has a reduced volume of recirculating internal air due to the decreased volume in the closed end so as to permit a quicker dampening effect. In particular, the closed end of the inner cylinder 12a is formed with a substantially conically-shaped hollow post 92 in approximately its central portion. The closed end is defined by spaced-apart narrow wall members 94a and 94b having a U-shaped slot 96 formed therebetween. The interior of the wall members serve to retain one end of the weaker spring 42 within the inner cylinder 12a. It should be apparent to those skilled in the art that the outer cylinder member 48 of FIG. 1 could also be formed in a like manner to facilitate the dampening effect.

Further, the secondary retainer cap 66 and the outer end of the secondary shaft 12 (inner cylinder member) may be formed with mating contours similar to the primary end cap 30 and the primary shaft 14 of FIG. 1 to function as additional anti-twist means to prevent the secondary shaft from being rotated relative to the outer cylinder member. Moreover, by placing the first and second orifices 24, 26 and the third and fourth orifices 60, 62 in opposite directions on the respective disc-like members, it is possible to actuate the dampening force during the retracting or contracting stroke of the primary and secondary shafts.

The air damper of the present invention has the following advantages over the prior art:

(1) it accommodates heavier loads within a relatively smaller area than those dampening devices traditionally available, (2) it has an overall length in its retracted position which is shorter than those traditionally available, but yet still provides a longer stroke length in its extended position, and (3) it utilizes only recirculating internal air via dual controllable orifice means for enabling the openable object of a varying load to be opened gently from a closed state.

From the foregoing detailed description, it can thus be seen that the present invention provides an improved air damper utilizing only recirculating internal air for dampening in one direction of movement of a glove compartment door which is openable and closable with respect to a glove compartment housing. The air damper is formed of inner and outer cylinder members, primary and secondary shafts, first and second controllable orifice means, primary and secondary end caps, and primary and secondary compression springs.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. An air damper utilizing only recirculating internal air for dampening in one direction of movement a door of a varying load which is openable and closable with respect to a housing, said air damper comprising:

an inner cylinder member having a closed end and an opened end;

a primary shaft reciprocally movably inserted into said inner cylinder member and including at its front end a first piston head telescopically slidable in the interior wall of said inner cylinder member for dividing the same into a first head chamber and a first shaft chamber;

said first piston head being formed of a pair of axially spaced-apart first and second disc-like members connected by a first rod, and a primary lip seal mounted slidably in an annular groove formed in the outer peripheral surface of said first rod;

first controllable orifice means including a first orifice formed in a portion of said first disc-like member, a second orifice formed in a portion of said second disc-like member, and a slot formed in the circumference of said first rod and extending throughout its entire length in the axial direction, said primary lip seal restraining the flow of air from the first shaft chamber to the first head chamber to pass only through said first orifice in accordance with the movement of said primary shaft in a first axial direction;

a primary end cap being fixedly secured in the open end of said inner cylinder member and having an annular flange with an opening for receiving said primary shaft therethrough;

a primary compression spring being disposed around said primary shaft and held between said second disc-like member and said annular flange of said primary end cap to resist projection of said primary shaft;

an outer cylinder member having a closed end and an opened end;

said inner cylinder member functioning as a secondary shaft which is reciprocally movably inserted into said outer cylinder member and including at its front end a second piston head telescopically slidable in the interior wall of said outer cylinder member for dividing the same into a second head chamber and a second shaft chamber;

said second piston head being formed of a pair of axially spaced-apart third and fourth disc-like members connected by a second rod, and a secondary lip seal mounted slidably in an annular groove formed in the outer peripheral surface of said second rod;

second controllable orifice means including a third orifice formed in a portion of said third disc-like member, a fourth orifice formed in a portion of said fourth disc-like member, and a slot formed in the circumference of said second rod and extending throughout its entire length in the axial direction, said secondary lip seal restraining the flow of air from the second shaft chamber to the second head chamber to pass only through said third orifice in accordance with the movement of said secondary shaft in the first axial direction;

a secondary end cap being fixedly secured in the open end of said outer cylinder member and having an annular flange with an opening for receiving said secondary shaft therethrough; and a secondary compression spring being disposed around said secondary shaft and held between said fourth disc-like member and said annular flange of said secondary end cap to resist projection of said secondary shaft.

2. An air damper as claimed in claim 1, further comprising anti-twist means formed on said primary shaft and said annular flange of said primary end cap for preventing said primary shaft from being rotated relative to said inner cylinder member.

3. An air damper as claimed in claim 2, wherein said anti-twist means comprises said primary shaft having a substantially cruciform configuration in its cross-section and the opening in said annular flange of said primary end cap having a contour which conforms to said primary shaft.

4. An air damper as claimed in claim 1, wherein said second orifice is relatively larger in size than said first orifice, and wherein said fourth orifice is relatively larger in size than said third orifice.

5. An air damper as claimed in claim 1, wherein said primary compression spring is relatively weaker than said secondary compression spring.

6. An air damper as claimed in claim 1, wherein said outer cylinder member is provided adjacent its closed end with means for mounting to said housing and said primary shaft is provided at its outer end with means for mounting to said door.

7. An air damper as claimed in claim 2, further comprising second anti-twist means formed on said secondary shaft and said annular flange of said secondary end cap for preventing said secondary shaft from being rotated relative to said outer cylinder member.

8. An air damper as claimed in claim 1, further comprising means for reducing the volume of recirculating air in said closed end of said inner cylinder member so as to permit a quicker dampening effect.

9. An air damper as claimed in claim 8, wherein said reducing means includes a hollow post formed in substantially the central portion of the closed end of said inner cylinder member.

10. An air damper for dampening in one direction of movement an openable object of varying load which is openable and closable with respect to a main object, said air damper comprising:

an inner cylinder member having a closed end and an opened end;

a primary shaft reciprocally movably inserted into said inner cylinder member and including at its front end a first piston head telescopically slidable in the interior wall of said inner cylinder member for dividing the same into a first head chamber and a first shaft chamber;

said first piston head being formed of a pair of axially spaced-apart first and second disc-like members connected by a first rod, and a primary lip seal mounted slidably in an annular groove formed in the outer peripheral surface of said first rod;

first controllable orifice means for restraining the flow of air from the first shaft chamber to the first head chamber to pass only through a first orifice in accordance with the movement of said primary shaft in a first axial direction;

first retaining means being fixedly secured in the open end of said inner cylinder member and having an annular shaft with an opening for receiving said primary flange therethrough;

first resilient means being disposed around said primary shaft and held between said second disc-like member and said annular flange of said first retaining means to resist projection of said primary shaft;

an outer cylinder member having a closed end and an opened end;

said inner cylinder member functioning as a secondary shaft which is reciprocally movably inserted into said outer cylinder member and including at its front end a second piston head telescopically slidable in the interior wall of said outer cylinder member for dividing the same into a second head chamber and a second shaft chamber;

said second piston head being formed of a pair of axially spaced-apart third and fourth disc-like members connected by a second rod, and a secondary lip seal mounted slidably in an annular groove formed in the outer peripheral surface of said second rod;

second controllable orifice means for restraining the flow of air from the second shaft chamber to the second head chamber to pass only through a second orifice in accordance with the movement of said secondary shaft in the first axial direction;

second retaining means being fixedly secured in the open end of said outer cylinder member and having an annular flange with an opening for receiving said secondary shaft therethrough; and second resilient means being disposed around said secondary shaft and held between said fourth disc-like member and said annular flange of said second retaining means to resist projection of said secondary shaft.

11. An air damper as claimed in claim 10, further comprising anti-twist means formed on said primary shaft and said annular flange of said first retaining means for preventing said primary shaft from being rotated relative to said inner cylinder member.

12. An air damper as claimed in claim 11, wherein said anti-twist means comprises said primary shaft having a substantially cruciform configuration in its cross-section and the opening in said annular flange of said first retaining means having a contour which conforms to said primary shaft.

13. An air damper as claimed in claim 10, wherein said first orifice is formed on said first piston head, and wherein said second orifice is formed on said second piston head.

14. An air damper as claimed in claim 10, Wherein said first resilient means is relatively weaker than said second resilient means.

15. An air damper as claimed in claim 10, wherein said outer cylinder member is provided adjacent its closed end with means for mounting to said main object and said primary shaft is provided at its outer end with means for mounting to said openable object.

16. An air damper as claimed in claim 11, further comprising second anti-twist means formed on said secondary shaft and said annular flange of said second retaining means for preventing said secondary shaft from being rotated relative to said outer cylinder member.

17. An air damper as claimed in claim 10, further comprising means for reducing the volume of recirculating air in said closed end of said inner cylinder member so a to permit a quicker dampening effect.

18. An air damper as claimed in claim 17, wherein said reducing means includes a hollow post formed in substantially the central portion of the closed end of said inner cylinder member.

19. An air damper as claimed in claim 10, wherein said first resilient means comprises a first compression spring.

20. An air damper as claimed in claim 19, wherein said second resilient means comprises a second compression spring.

* * * * *